Aug. 12, 1930.  J. W. COX  1,772,537

CONDUIT FITTING

Original Filed March 22, 1926

INVENTOR.
John W. Cox
BY
ATTORNEYS.

Patented Aug. 12, 1930

1,772,537

UNITED STATES PATENT OFFICE

JOHN WILLIAM COX, OF ERIE, PENNSYLVANIA, ASSIGNOR TO ERIE MALLEABLE IRON COMPANY, OF ERIE, PENNSYLVANIA, A CORPORATION OF PENNSYLVANIA

CONDUIT FITTING

Application filed March 22, 1926, Serial No. 96,399. Renewed December 27, 1928.

This invention is directed to the improvement of conduit fittings designed for use with threadless conduits. Such fittings have been formed with clamping means for engaging threadless conduits but some difficulty has been experienced with such fittings particularly with relation to making the same watertight. The present invention provides a simple and efficient means for sealing such fittings. Features and details of the invention will appear from the specification and claims.

The invention is illustrated in the accompanying drawings as follows:—

Figure 1:
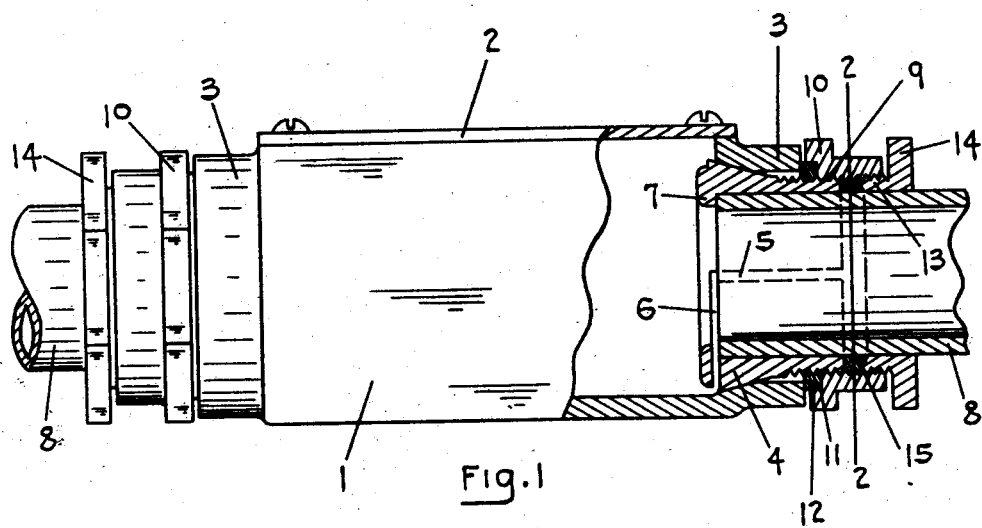

Fig. 1 shows a side elevation, partly in section, of a conduit box with which the invention is exemplified.

Figure 2:
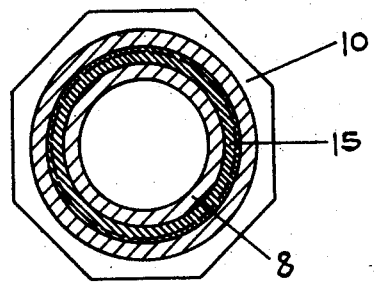

Fig. 2 a section on the line 2—2 in Fig. 1.

1 marks the body of the box. This is provided with the usual cover 2 and extension 3 having a tapered opening therethrough.

A sleeve 4 is arranged in the extension. This is provided with a longitudinal slit 5 to render the sleeve contractible and a circumferential slit 6 extending from the longitudinal slit permits such contraction and at the same time affords a continuous wall over which the conductor may be drawn. The sleeve has a guard shoulder 7 against which an inserted conduit 8 abuts. The outer end of the sleeve is screw-threaded at 9 and a nut 10 operates on these screw threads to draw the sleeve into the opening and through the wedging action of the tapered surfaces of the sleeve and opening contract the sleeve into clamping engagement with the conduit.

The nut 10 has a gland 11 on its inner face in which a gasket 12 is placed, the gasket being forced against the end of the extension and sealing the joint between the nut and the extension.

The nut extends over the end of the sleeve and a follower 13 is screwed into the nut, the follower having a flange 14 of polygonal shape to afford a ready wrench-hold preferably of the same size as the wrench-hold on the nut 10. A gasket 15 is placed within the nut between the ends of the sleeve and the follower 13. The follower preferably has its inner end slightly bevelled to force the gasket into more intimate contact with the conduit. In this way a complete and positive seal is made against leakage even under pressure through the contracted joint.

Further the follower forms in effect a locking nut which tends to lock the nut 10 against jarring loose where the conduit is subjected to jar. The pressure effect of the gasket 15 on the conduit is added to the clamping engagement for holding the conduit in place. It will be understood that the gaskets are formed of comparatively soft material and are, therefore, forced not only against the end faces of the engaging parts but also forced into the threads.

While I have shown this in connection with an electric conduit and with relation to a conductor opening I do not wish to be understood as limiting my invention to an electric conduit, or fitting, as such conduit by reason of this water-tight connection may be used wherever a water-tight connection in a pipe or conduit is desired.

What I claim as new is:—

1. In a conduit fitting, the combination of a body having an opening therein; a contractible longitudinally slitted sleeve in the opening having a wedging surface engaging the walls of the opening and a screw thread; a nut having a screw thread operating on the sleeve exerting thrust with relation to the body to force the sleeve along the opening, said nut and said thread therein extending beyond the end of the sleeve; a follower screwed into the screw threads in the nut; and a gasket between the follower and the end of the sleeve.

2. In a conduit fitting, the combination of a body having an opening therein; a contractible longitudinally slitted sleeve in the opening having a wedging surface engaging the walls of the opening and a screw thread; a nut having a screw thread operating on the sleeve exerting thrust with relation to the body to force the sleeve along the opening, said nut and said thread therein extending beyond the end of the sleeve; a follower screwed into the screw threads in the nut; a gasket between the follower and the end of the sleeve; and a gasket between the nut and the body.

In testimony whereof I have hereunto set my hand.

JOHN WILLIAM COX.